Oct. 7, 1924.

A. A. ASPLUND 1,510,576

FUEL PUMP CONTROL LEVER WITH CONNECTIONS

Filed Feb. 17, 1920

Inventor
Axel A. Asplund

By Mason Fenwick & Lawrence,
Attorneys

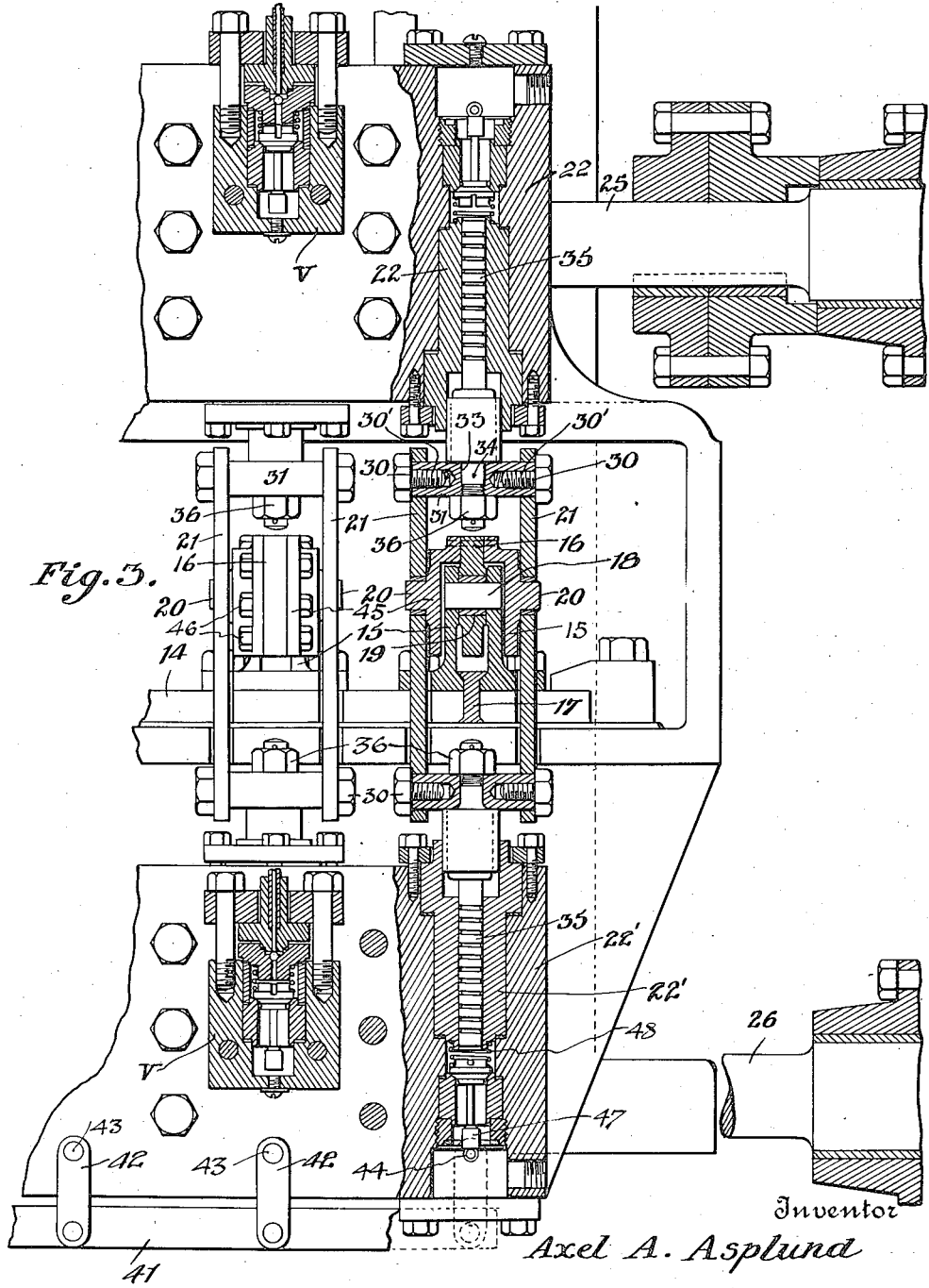

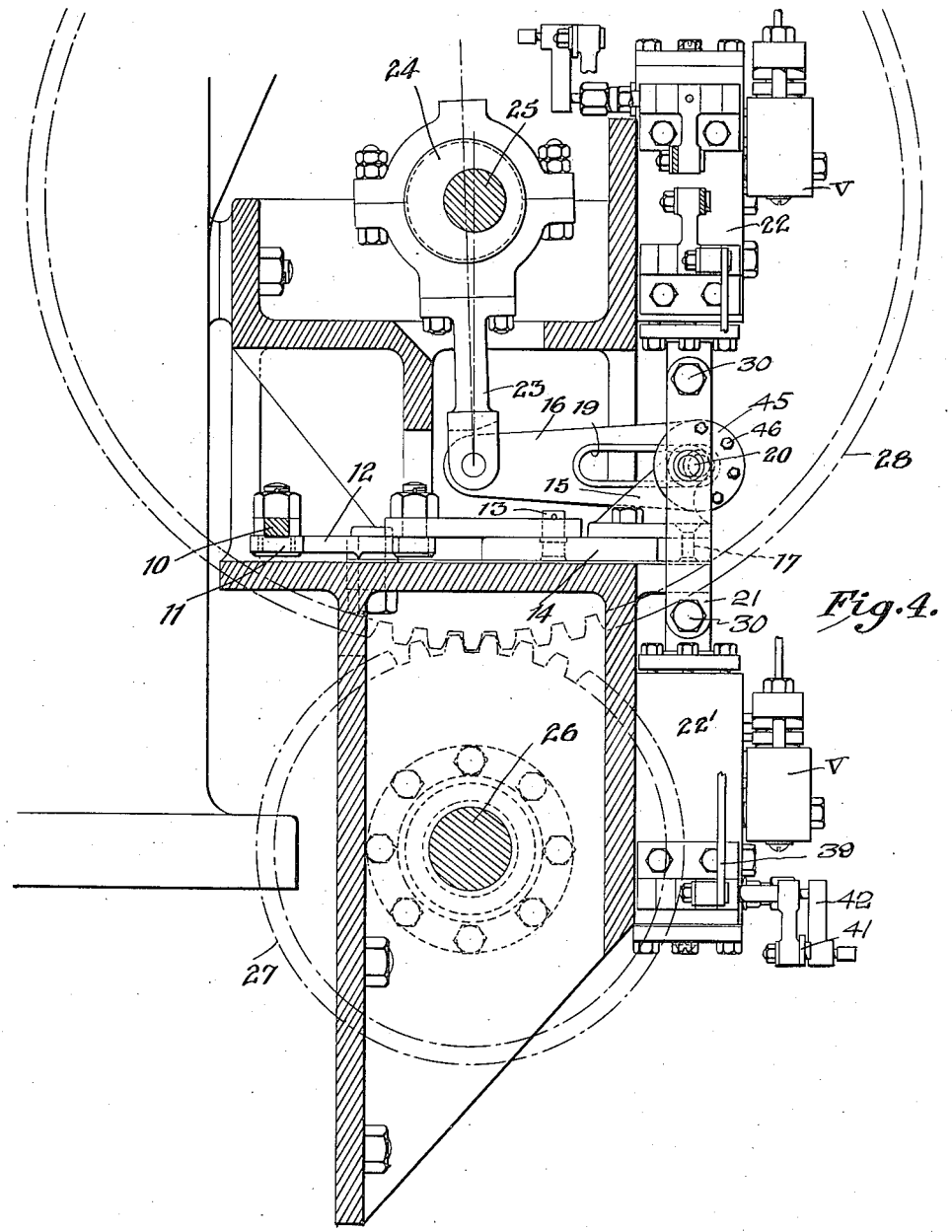

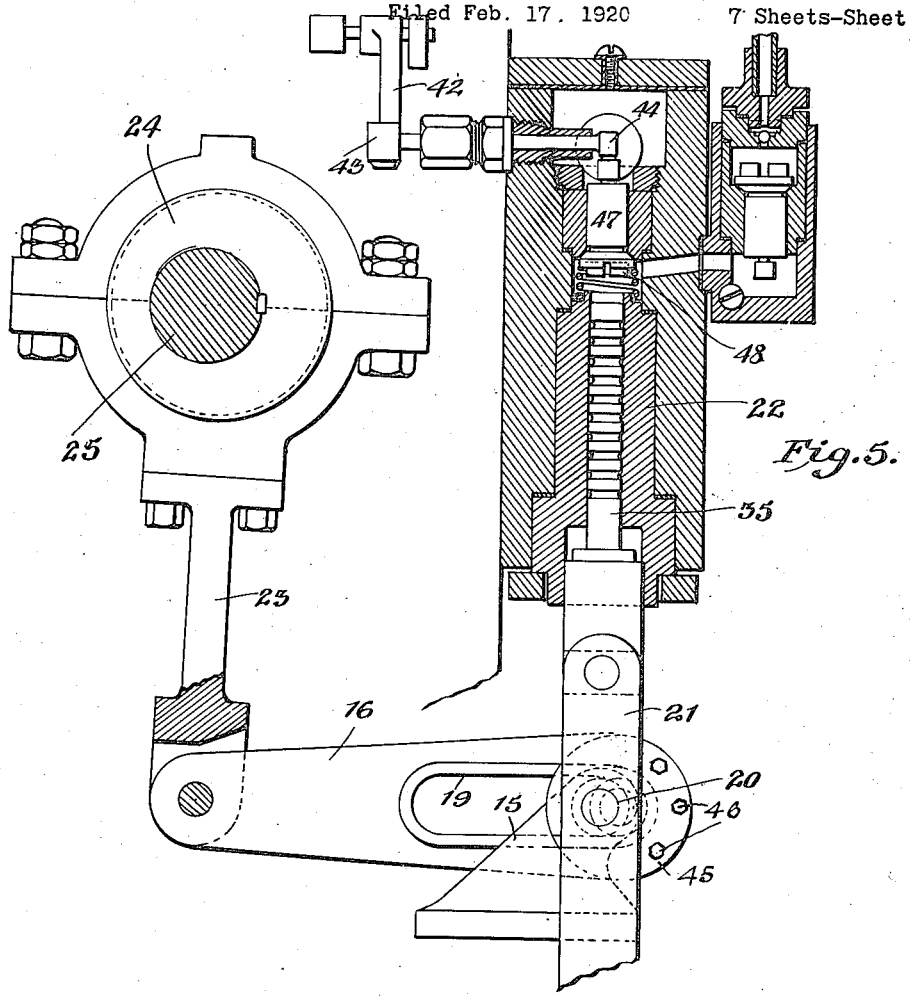

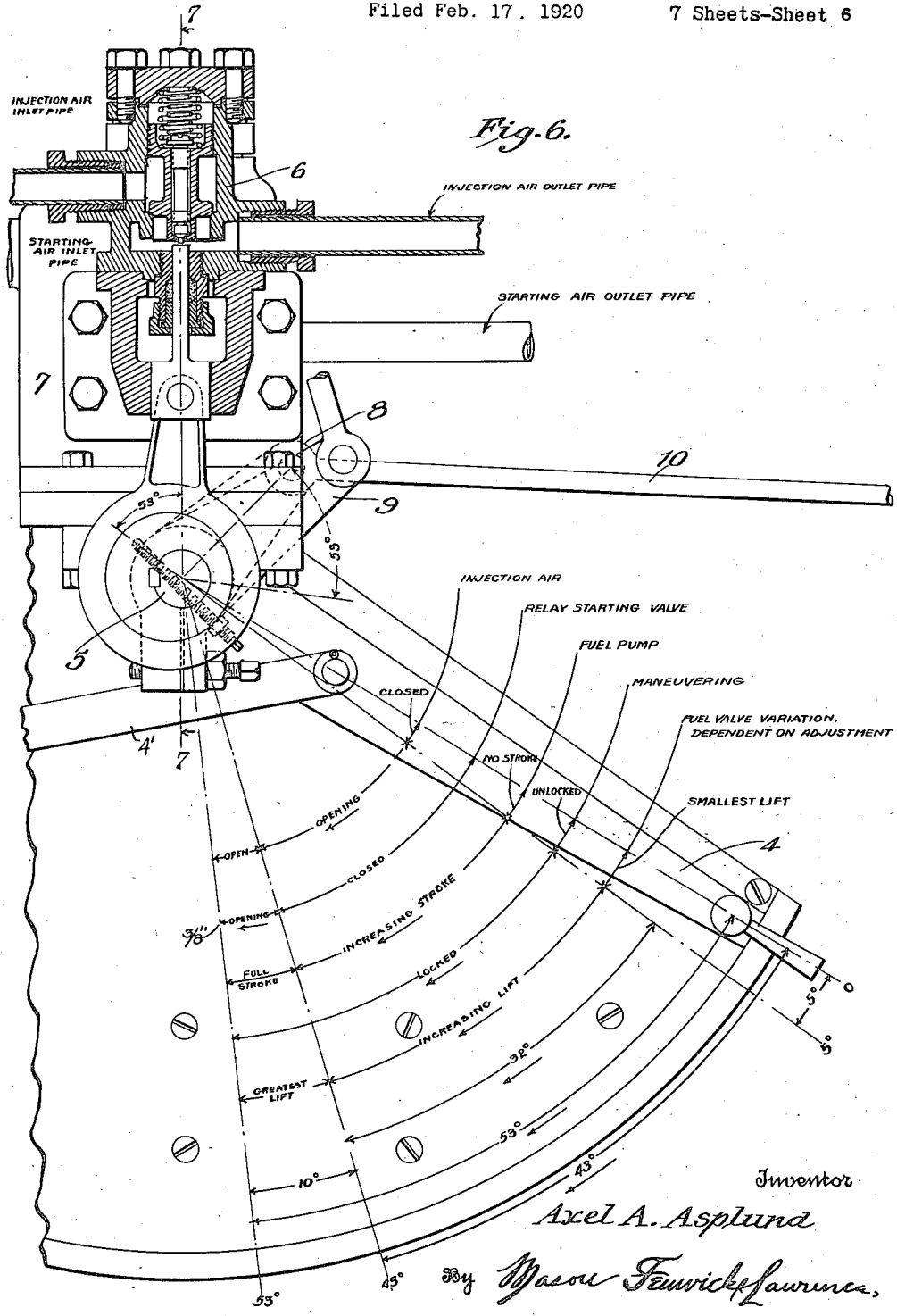

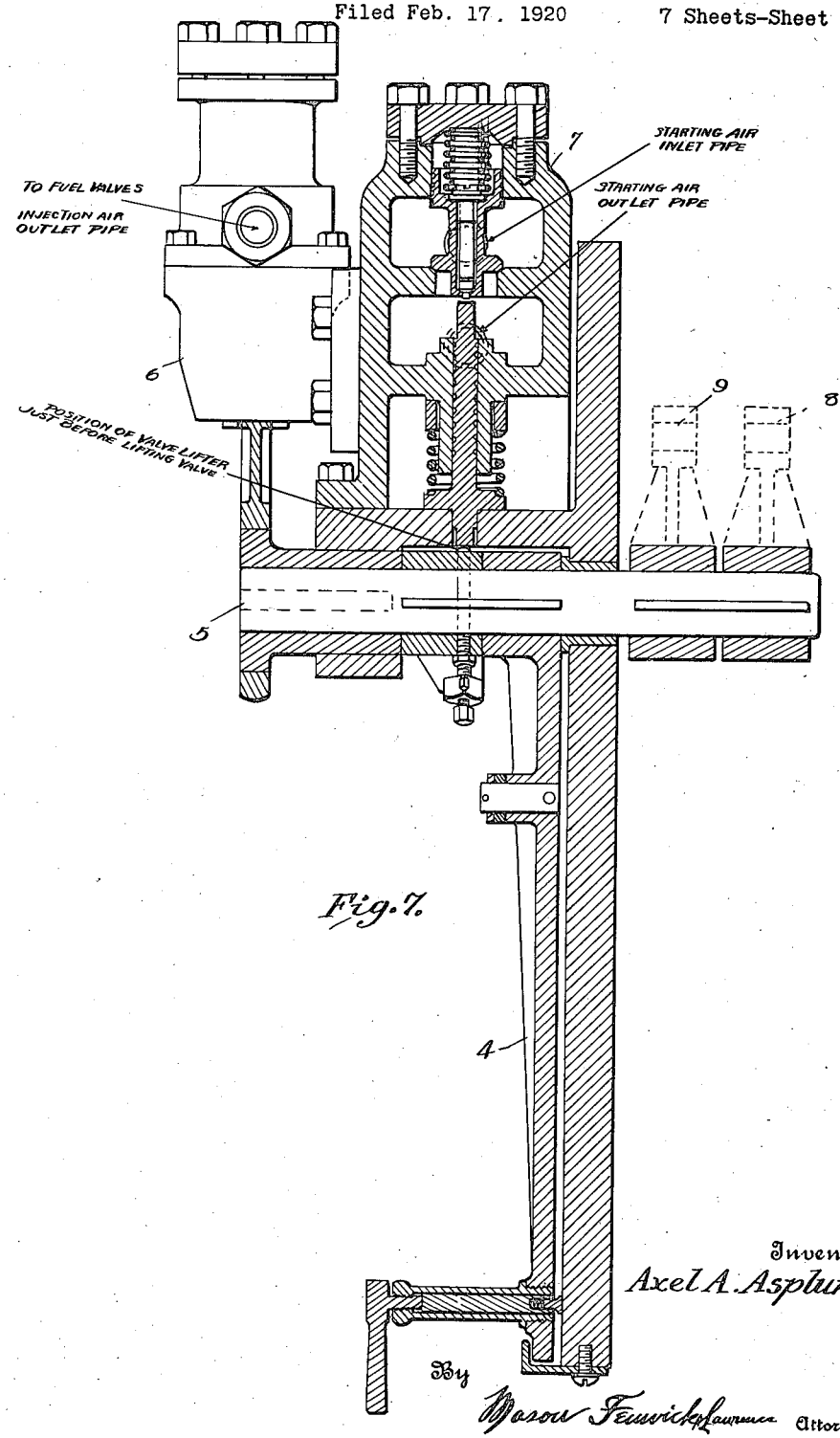

Patented Oct. 7, 1924.

1,510,576

UNITED STATES PATENT OFFICE.

AXEL AUGUST ASPLUND, OF AUBURN, NEW YORK.

FUEL-PUMP-CONTROL LEVER WITH CONNECTIONS.

Application filed February 17, 1920. Serial No. 359,416.

*To all whom it may concern:*

Be it known that I, AXEL A. ASPLUND, a citizen of the United States, residing at Auburn, in the county of Cayuga and State of New York, have invented certain new and useful Improvements in Fuel-Pump-Control Levers with Connections; and I do hereby declare the following to be a full, clear, and exact description of the invention, such as will enable others skilled in the art to which it appertains to make and use the same.

This invention relates to thermodynamics and particularly to fuel pumps in internal combustion engines, and while especially adapted to fuel pumps of the Diesel type of engine, is not limited thereto.

This application is one of a series of seven applications being substantially simultaneously filed and bearing Serial Nos. 375,410-11-12-13-14 and 15, in which cooperative elements in relation to the matters herein described are more fully set forth.

In the type of engines to which the said applications including the present one are particularly adaptable it is desirable to inject the fuel under pressure into the cylinders, which usually receive injected air with the fuel at a pressure of about one thousand pounds to the square inch necessitating the pumping of the fuel under a like pressure plus the friction of the pipes between the pump and the cylinder.

It is an object of this invention to provide a fuel pump cooperative with the elements set forth in the said applications and which is automatically operative by the control of the said elements.

It is a further object of this invention to provide an improved means of driving a fuel pump and to provide an improved fuel pump and an improved organization of a plurality of fuel pumps.

With these and other objects in view the invention consists in the construction, the combination, the detail and arrangement of parts as hereinafter more fully described and claimed.

In the drawings:

Figure 3 is an enlarged view partly in elevation and partly in section of a fragmentary part of Figure 2.

Figure 4 is an irregular section partly in elevation substantially at 4—4 in Figure 2.

Figure 5 is an enlarged fragmentary view partly in elevation and partly in section of the upper portion of Figure 4.

Figure 6 is an enlarged view partly in elevation and partly in section of a portion of Figure 1 nearer the middle thereof than Figure 2.

Figure 7 is a section at 7—7 of Figure 6 being also partly in elevation.

Figure 1:
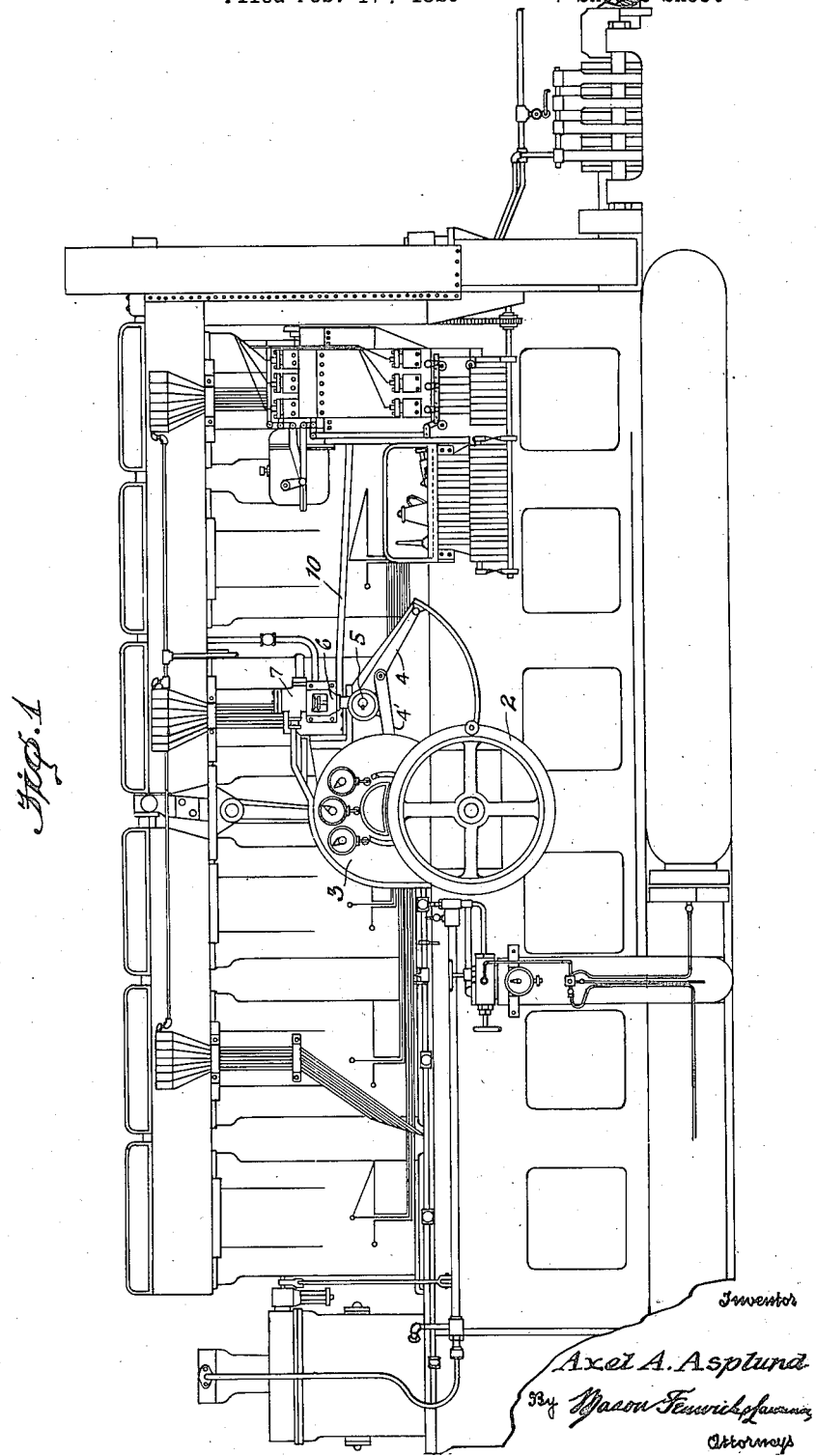
Figure 1 is a side elevation of an engine of the Diesel type showing my improvements thereon.
Figure 2:
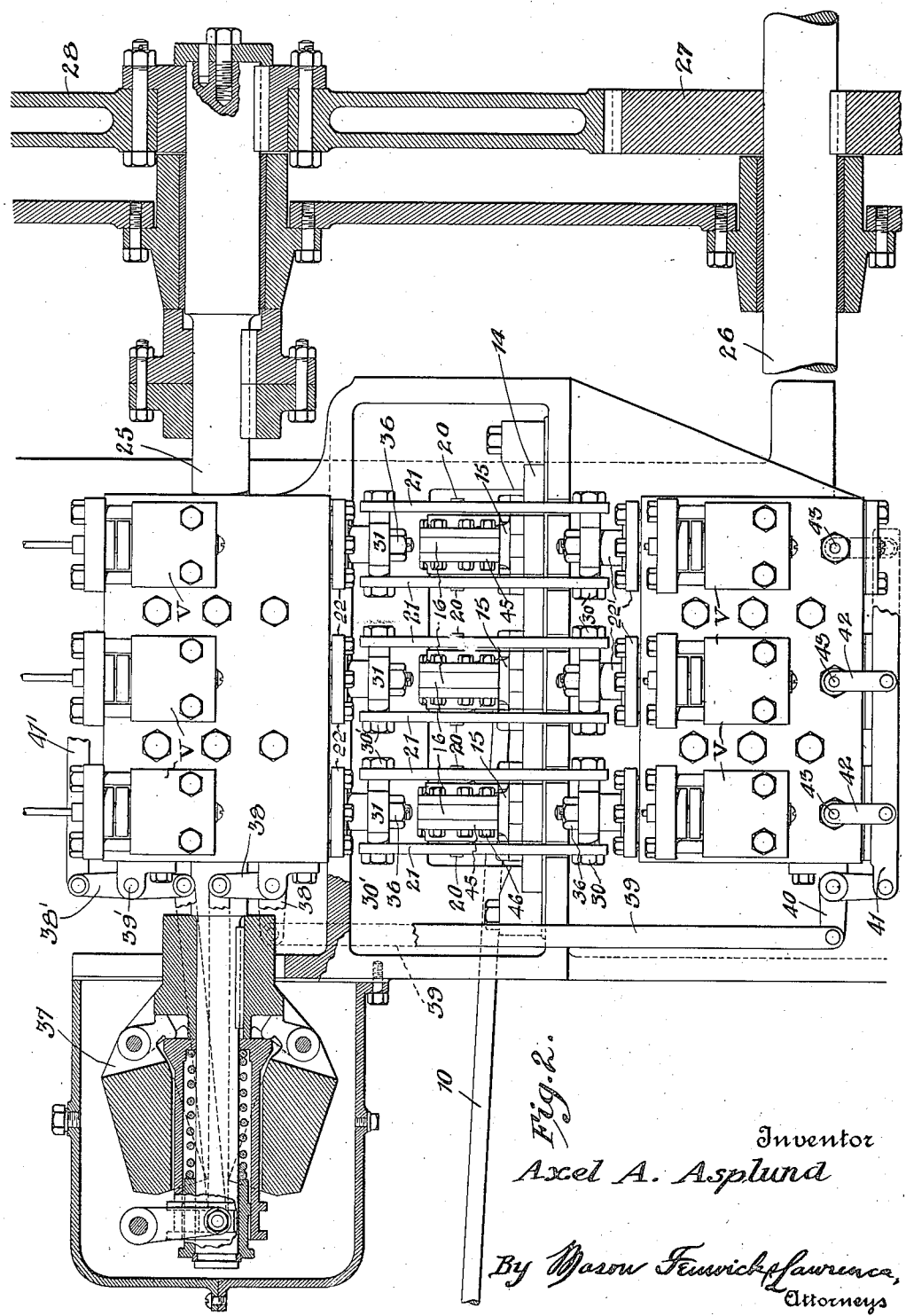
Figure 2 is an enlarged view partly in elevation and partly in section of a portion of the right hand side of Figure 1.

In the general organization shown in Figure 1 there is provided a maneuvering wheel 2 which transmits rotary motion to a rotor 3 at a preferable ratio of one to four, that is to say, four revolutions of wheel 2 rotates rotor 3 one revolution, and which rotor 3 performs many distinct functions more fully described in the said copending applications and hereinafter more fully referred to. There is also provided a starting lever 4 pivotally mounted on shaft 5 and provided with a locking bar 4' for locking rotor 3 from movement at predetermined position of lever 4 and also locking lever 4 from movement at predetermined position of rotor 3. Shaft 5 as better shown in Figure 7 controls a number of distinct operations, amongst them the injection air valve 6, a starting air relay valve 7 and the fuel valve inlet into the engine cylinder from a crank 8 and the pump hereinafter more fully described from a crank 9. Extending across the engine from crank 9 fixed to shaft 5 is a connecting rod 10 as shown in Figure 1, one end thereof being shown in Figure 2, and which is pivoted at 11, as shown in Figure 4, to a bell crank 12, which bell crank is pivotally mounted at 13 to a sliding table 14, upon which sliding table are mounted brackets 15, which brackets are better shown in Figure 5 and are clearly shown in cross section in Figure 3, they being of a yoke structure and straddling a rocker 16 and being fixedly mounted to table 14 by a stud 17 and being also provided with a shaft 18 extending through a slot 19 in rocker 16. Plates 45 carrying pivots 20 are secured as by bolts 46 to the sides of rocker 16 and in turn straddle brackets 15 (see Fig. 3), the pivots 20 being seated in bearings provided therefor in bars 21 which connect the reciprocating members of pumps 22 and 22'. When table 14 is moved to the left as from the position illustrated in Figure 4, shaft 18 slides likewise to the left in rocker 16 and forms a fulcrum for the said rocker at different positions thereon. In the position shown in Figure 4 the movement of rocker 16 on its pivot to bars 21 would cause no movement of bars 21 but upon shaft 18 being moved to the left a movement of rocker 16 would cause a vertical reciprocation of bars 21, the amount of reciprocation dependent upon the distance the table 14 and the shaft 18 are moved. It thereby becomes obvious that a movement of bar 10 would vary the length of movement of bars 21 under like movement of rocker 16. Rocker 16 is provided with an oscillating movement by a pitman 23 reciprocated by an eccentric 24 upon a countershaft 25 which is driven by the engine crank shaft 26 and comeshing gears 27 and 28. Thus upon the rotation of crank shaft 26 a movement of rod 10 by starting lever 4 controls whether or not and the extent to which the fuel pumps 22 and 22′ are operative. As shown in Figures 1 and 2 there are six of these fuel pumps corresponding to the six cylinders of a six cylinder engine, these pumps being mounted three above the table 14 and three below the table 14, there being on table 14 three pairs of brackets 15 and three pairs of bars 21 and also three rockers 16. As shown in Figures 3 and 5, bars 21 are mounted at 30 to a bridge 31 by screws 30′, which bridge 31 is perforated at 33 to receive a turned end 34 of a pump plunger 35 which is affixed thereto by a lock nut 36. Mounted also on shaft 25 is a centrifugal governor 37 which operates the bell crank 38, which bell crank 38 in turn operates a connecting rod 39, which connecting rod 39 operates another bell crank 40, which bell crank 40 reciprocates a bar 41 pivotally mounted to a series of levers 42, which levers 42 are affixed to shafts 43 carrying cams 44, which cams 44 operate against a supply valve 47 yieldingly held against said cam by a spring 48. The centrifugal governor 37 also operates upon a lever 38′ causing it to reciprocate upon a pivot 39′ and to reciprocate a bar 41′ likewise connected to levers 42 of the top series of pumps. Each pump is provided with a suitable delivery valve V from which the fuel passes to the respective cylinders.

In the diagrammatic part of Figure 6 is shown the cooperation between the fuel pump control herein and the other elements interconnected therewith. That is to say during the first 5° movement of lever 4, in which there is no stroke to the fuel pump, the injection air valve is closed, the relay starting valve is closed, the maneuvering wheel is unlocked and the fuel valve is at its smallest lift, and during the next 32° movement of starting lever 4, during which the fuel pump is increasing in its stroke, the injection air valve is opening, the relay or starting valve is still closed, the maneuvering wheel is locked and the fuel valve is increasing in its lift, and then during the last 10° movement of lever 4, during which the fuel pump is at its full stroke, the injection air valve is open, the relay or starting valve is opening and becomes finally opened at the end of said 10° to three eighths of an inch lift, the maneuvering wheel is still locked and the fuel valve is at its greatest lift.

What I claim is:

1. In an internal combustion engine, a bracket providing for a mount for a plurality of pairs of fuel pumps, means interconnecting the members of said pairs to cause the members of each pair to have their pistons reciprocate together, a table provided with brackets thereon carrying pivots, rocker arms mounted on said pivots, one end of said arms mounted to said interconnecting means and the other end of said arms operable by the turning of said engine, said table slidable to vary said pivotal point in its position on said rocker arms.

2. In an internal combustion engine having a plurality of fuel pumps arranged in oppositely disposed pairs and having reciprocating pistons, means connecting said oppositely disposed pistons, a rocker arm for each pair of pumps, said rocker arms pivotally connected with said piston connecting means, means driven from the engine for rocking said rocker arms, a reciprocating table, pivotal supports for each of said rocking arms carried by said table and means for reciprocating said table to vary the position of said pivotal supports for said rocker arms to vary the stroke of said fuel pump pistons.

3. In an internal combustion engine, two fuel pumps each having a reciprocating piston, said pumps arranged in longitudinal alignment with their pistons connected by spaced members, a slotted rocker arm pivoted adjacent one end between said spaced members, means for rocking the rocker arm from the engine, a pivotal support for the rocker arm passing through the slot therein and means for sliding the pivotal support in said slot.

In testimony whereof I affix my signature.

AXEL AUGUST ASPLUND.